United States Patent Office 2,723,929
Patented Nov. 15, 1955

2,723,929

SOLDERING FLUX AND METHOD OF PREPARATION

Frank C. Wagner, Solon, and Tien-Shih Liu, Cleveland, Ohio, assignors to Horizons Incorporated, Princeton, N. J., a corporation of New Jersey No Drawing. Application June 18, 1954, Serial No. 437,884

9 Claims. (Cl. 148—26)

This invention relates to the soldering of aluminum. More particularly, the invention resides in a novel flux composition for use in soldering aluminum as well as the method of preparing this composition.

The soldering of aluminum is made difficult by the fact that aluminum always bears a surface layer of aluminum oxide to which other metals will not adhere. Over the period of the last half century there have been many proposals of flux composition which would remove such an oxide layer and thus expose a fresh aluminum surface to which a solder would adhere, and these compositions frequently contain aluminum chloride or aluminum sulfate in admixture with other metal halides. However, it has been generally conceded that no flux developed heretofore has been capable of readily removing an aluminum oxide surface layer at a temperature lower than about 450° C. For this reason, all procedures for using lower aluminum soldering temperatures have included the step of forming a freshly exposed metallic aluminum surface by scraping away the surface oxide layer while the surface is protected from the atmosphere by a supernatant layer of molten solder or flux, or both.

We have now discovered that a certain relatively simple and inexpensive composition having a melting point below 250° C. has such an affinity for the usual oxide coating on an aluminum surface at temperatures below 250° C. that it will effectively remove this surface oxide layer and thus expose an oxide-free aluminum surface for soldering. The flux composition which we have found to have these characteristics is composed essentially of aluminum chloride and one or more alkali metal chlorides of the group consisting of sodium, potassium and lithium chlorides. Our novel flux composition is not simply a mixture of the aluminum chloride and the alkali metal chloride but is the intimate combination of these two constituents which results when a mixture of aluminum chloride and an alkali metal chloride is fused to the state of homogeneity. Moreover, the relative proportions of aluminum chloride and alkali metal chloride in this product is important, the molar proportion of aluminum chloride in the aluminum chloride-alkali metal chloride mixture ranging between about 52% and 82%. The weight proportions corresponding to this range of molar proportions for the aluminum-chloride alkali metal chloride component of the mixture is shown in the following table for binary compositions of aluminum chloride and a single alkali metal chloride.

| Composition | Mol Percent AlCl₃ | Weight Percent AlCl₃ |
|---|---|---|
| AlCl₃—LiCl | 52 | 77 |
| AlCl₃—LiCl | 70 | 88 |
| AlCl₃—LiCl | 82 | 94 |
| AlCl₃—NaCl | 52 | 70 |
| AlCl₃—NaCl | 70 | 84 |
| AlCl₃—NaCl | 82 | 91 |
| AlCl₃—KCl | 52 | 65 |
| AlCl₃—KCl | 70 | 81 |
| AlCl₃—KCl | 82 | 90 |

The aluminum which may be soldered using the flux composition of our invention may be substantially pure aluminum or any of its alloys in which aluminum is present in amount of at least 90% by weight, and both aluminum metal itself and such aluminum base alloys are therefore included in the subsequent use of the term "aluminum" herein and in the claims. It must also be understood that the flux composition of our invention is not limited to the soldering together of two aluminum parts but is equally applicable to the soldering of aluminum to copper, to copper base alloys and particularly the brasses and beryllium copper, to silicon bronzes and to manganese bronzes. Thus, the joining of aluminum parts to non-aluminum parts is made possible by simple soldering techniques by the use of our novel flux composition.

The flux composition of our invention consists predominantly and essentially of aluminum chloride and one or more of the alkali metal chlorides consisting of sodium chloride, potassium chloride and lithium chloride. Because of its lower cost, sodium chloride is presently preferred as the alkali metal halide constituent and will be referred to hereinafter as a representative of this group, but it must be understood that what is said hereinafter with respect to the use of sodium chloride applies with equal effect to potassium and lithium chlorides. The form of the mixture of aluminum chloride and alkali metal chloride pursuant to our invention is important. Simple mixtures of these salts have a relatively high fusing point, and such mixtures are therefore not useful as the flux composition of our invention. However, when a mixture of aluminum chloride and sodium chloride in which the molar proportion of aluminum chloride is at least 52% is heated to the fusion point, there is obtained, particularly with the aid of stirring, a homogeneous mixture of the two salts which comprises the flux composition of our invention. This composition may be used either in its molten condition or it may be allowed to solidify following which it is broken up into a mass of relatively fine particles which can be easily handled and applied to the aluminum surface to be soldered. In either the molten or solidified form, the composition is truly homogenized so as to have definite melting and freezing points which vary only with the relative proportions of the constituents of the composition.

The relative proportions of aluminum chloride and sodium chloride in the homogenized composition of our invention are also important. Amounts of aluminum chloride less than about 52% on a molar basis yield compositions which have melting points substantially above 200° C. as distinguished from the flux compositions of our invention which are characterized by melting points below 200° C. With increasing proportions of aluminum chloride above the 52 molar percent lower limit, there are first produced compositions having still lower melting points and thereafter still greater proportions of aluminum chloride produce compositions having higher melting points than the minimum. However, beyond the proportions of about 82 molar percent of aluminum chloride and 18 molar percent of sodium chloride, the composition tends to lose to a significant degree the affinity for an aluminum oxide surface film which is characteristic of the composition of our invention and moreover the composition tends to become unstable as evidenced by pronounced volatilization of aluminum chloride. Thus, it will be seen that homogenized mixtures of aluminum chloride and sodium chloride in which the molar proportion of aluminum chloride to sodium chloride ranges from 52 to 82% comprise the composition of our invention. Within this range we presently prefer to use between 52 and 70 mol percent of aluminum chloride because within this range the resulting aluminum chloride-sodium chloride mixture has a melting point within the range of about 120° and 160° C.

In preparing the flux composition of our invention, we have found it advisable to first add the aluminum chloride component to a melting vessel and then add the sodium chloride component (as well as the heavy metal chloride component if used). The latter serves as a blanket to prevent escape of aluminum chloride as the mixture is heated. Although sodium chloride melts at about 800° C., we have found that raising the temperature of the aluminum chloride blanketed with sodium chloride to about 300° C. causes the salts to go first through a mushy state and then into a clear liquid state. After the liquid state has been attained, we have found it advantageous to stir the liquid melt in order to insure complete homogeneity of the flux components. Once this homogeneity has been achieved by melting, and preferably by further stirring the melt, the liquid flux composition is allowed to cool and solidify. The solid composition is then crushed or ground to a fine state, advantageously to minus 325 mesh (Tyler Standard), or even to powder form, whereupon it is ready for use.

When the flux composition of our invention makes contact in the molten state with the normal oxide layer on an aluminum surface, the oxide layer is promptly removed by the flux thus exposing a clean metal surface which is readily wetted by solder. Inasmuch as this oxide removal is effected by our flux at temperatures below about 250° C., it will be appreciated that our flux composition makes possible the soldering of the aluminum surface with soft solders having melting points below about 250° C. The solder, which can be of any of the conventional tin-lead and zinc-base compositions, may be brought into contact with the aluminum in any desired manner. For example, after the flux has been melted in contact with the aluminum surface the solder may be brought into contact with the resulting clean metal surface in the form of a stick or bar. On the other hand, both solder and flux may be brought in the solding zone at the same time by any of the conventional procedures of forming a composite body of the solder and flux in which either the solder or the flux forms a central core surrounded by the other component. However, we have found that an intimate composite mixture of solder and flux can be obtained by admixing in the powdered form about 10 to 15% by weight of the flux with 85 to 90% of the solder and by moistening this mixture with an inert liquid such as carbon tetrachloride so as to form a paste which can be applied directly to the aluminum surface to be soldered.

Although the flux composition of our invention is so effective at temperatures below 250° C. that it makes possible the use of soft solders having melting points below 250° C., the versatility of our flux composition is demonstrated by the fact that it may be used with equal success with the so-called hard solders having melting points above 400° C. Thus, the flux composition of our invention may be used in a soldering operation in which a conventional soldering iron is the heating device or in which the open flame of a blowtorch is the source of heat. After the soldering has been completed, the flux is readily removed by washing with water so as to remove all vestige of potentially corrosive chloride salts.

We have further found that our novel flux composition can be supplemented by the addition of a minor amount of a heavy metal chloride. Although amounts of these heavy metal chlorides, or mixtures of such chlorides, can be used up to about 50% by weight of the total flux composition, we have found that heavy metal chloride additions ranging from 1% to 25% are generally the most satisfactory. These heavy metal chlorides increase the fluidity of the flux composition in the molten state and also increase its aluminum surface-wetting action, particularly at temperatures below about 200° C. Virtually any heavy metal chloride may be used for this purpose, as can be seen by the fact that the following representative heavy metal chlorides have been found to be useful additives, either singly or in admixture with one another, for the flux composition of our invention:

Manganous chloride
Zinc chloride
Chromic chloride
Gallium trichloride
Ferrous chloride
Cadmium chloride
Indium chloride
Tellurium monochloride
Cobalt chloride
Nickelous chloride Stannous chloride
Lead chloride
Cupric chloride
Cuprous chloride
Mercurous chloride
Silver chloride
Rhodium chloride
Palladium dichloride
Aurous chloride
Auric chloride The following examples will illustrate the preparation of the flux composition of our invention:

*Example I*

A mixture of 20 parts of stannous chloride ($SnCl_2$) and 20 parts by weight of common salt (NaCl) was used as a blanket to cover 60 parts by weight of aluminum trichloride ($AlCl_3$) in a melting vessel. When this charge was heated, the stannous chloride-sodium chloride blanket minimized the loss of aluminum trichloride by combining with the latter before it had a chance to volatilize. Because of the high melting point of sodium chloride (approximately 800° C.), it is necessary in preparing the flux to heat the mixture to a temperature substantially higher than the melting temperature of the resulting homogeneous flux composition. For this reason, the charge was heated to a temperature of 300° C. After first going through a mushy state during this heating, the salt mixture was gradually transformed into a homogeneous clear melt. The salt melt was then stirred for a few minutes in order to insure complete homogeneity of the melt composition. After cooling the melt, a solidified mass was obtained which had a freezing point of about 150° C. The solid mass, which comprises a flux composition according to our invention, was then pulverized. The powdered flux was then mixed with powdered solder (3% Zn, 35% Sn and 62% Pb) in the weight ratio of one part of flux to about 9 parts of solder. The resulting mixture was applied to an aluminum joint with a low temperature torch. The flowability of this flux was extremely high and produced a flawless soldered joint without using a temperature above about 200° C.

*Example II*

The flux prepared as described in Example I was poured into the center cavity of a round rod of solid soft solder (50% Pb–50% Sn). This filled solder was then rolled down to ⅛" diameter and was used as ordinary cored solder for joining aluminum. In this form, a large-tip soldering iron was found to be more desirable than a torch.

*Example III*

The flux described in Example I was used as a straight flux. It was spatulated to the portion of the aluminum parts to be joined and heat was applied to the parts indirectly with the flame of a low temperature torch, e. g., a propyl alcohol torch. As the flux began to flow, wire solder (Pb 60%, Sn 35%, and Zn 5%) was immediately applied. This method is especially suitable for repairing aluminum where a large solder build-up is desired.

*Example IV*

A flux was made by melting 60 parts of aluminum chloride ($AlCl_3$) with a blanket of 20 parts by weight of common salt (NaCl) at 300° C. To this mixture, 20 parts by weight of zinc chloride ($ZnCl_2$) were added, and the resulting melt was well stirred during cooling. The solidified mass was then pulverized, and was ready to be used in the soldering operations described in previous examples. An open flame did not impair wetting and spreading properties of this fluid composition.

Example V

A flux was made by melting together 70 parts of aluminum trichloride covered by a blanket of 30 parts by weight of sodium chloride. The mixture was heated to a temperature of 300° C., and after a melt was formed it was thoroughly stirred to insure complete solution of the salts in one another. After a homogeneous fluid was thus obtained, the melt was cooled and pulverized. This pulverized powder was then ready for use as a representative aluminum soldering flux of our invention. When used as a straight flux in conjunction with a 70% Sn 30% Zn solder, the flowability of the solder was extremely high. In fact, by putting the solder at only one point on a piece of aluminum one inch square after applying this flux, it was found that the solder drop spread out to cover the entire area of the aluminum piece with a thin uniform layer of the solder. After rinsing the soldered surface with water, a shiny silvery-white joint was found to have been formed.

It will be seen, accordingly, that the flux composition of our invention makes possible the soldering of aluminum metal and aluminum alloys by conventional soldering techniques which were never successful heretofore in soldering aluminum. Our novel flux composition is not only characterized by a melting point below about 200° C., and generally within the range of about 120° to 160° C., but in the fluid state near its melting temperature it is characterized by ready solubility or affinity for the surface aluminum oxide film on aluminum metal and aluminum base alloys. Thus, our flux composition makes possible for the first time the soldering of aluminum surfaces by the low temperature soft-soldering techniques with which copper has been soldered in the past. Moreover, our flux composition is sufficiently stable at much higher temperatures so as to permit its use with hard solders and even with brazing alloys.

We claim:

1. A soldering flux for aluminum characterized by both a melting point and a solubility for surface oxide on aluminum below about 250° C. which consists essentially of the product of fusing to homogeneity a mixture of aluminum chloride and an alkali metal chloride of the group consisting of sodium, potassium and lithium chlorides in which the molar proportion of aluminum chloride in the aluminum chloride-alkali metal chloride mixture ranges between about 52% and about 82%.

2. A soldering flux for aluminum characterized by both a melting point and a solubility for surface oxide on aluminum below about 250° C. which consists essentially of the product of fusing to homogeneity a mixture of aluminum chloride and an alkali metal chloride of the group consisting of sodium, potassium and lithium chlorides in which the molar proportion of aluminum chloride in the aluminum chloride-alkali metal chloride mixture ranges between about 52% and about 70%.

3. A soldering flux for aluminum characterized by both a melting point and a solubility for surface oxide on aluminum below about 250° C. which consists essentially of the product of fusing to homogeneity a mixture of aluminum chloride and sodium chloride in which the molar proportion of aluminum chloride in the aluminum chloride-sodium chloride mixture ranges between about 52% and about 82%.

4. The method of producing a soldering flux for aluminum characterized by both a melting point and a solubility for surface oxide on aluminum below about 250° C. which comprises covering a mass of solid aluminum chloride in a melting vessel with a mass of a solid alkali metal chloride of the group consisting of sodium, potassium and lithium chlorides, the molar proportion of aluminum chloride in the aluminum chloride-alkali metal chloride mixture ranging between about 52% and about 82%, heating the resulting salt mass to a temperature of at least about 300° C. to form a clear homogeneous melt, cooling the melt until it solidifies, and then comminuting the resulting solid product into a form suitable for use as a soldering flux.

5. The method of producing a soldering flux for aluminum characterized by both a melting point and a solubility for surface oxide on aluminum below about 250° C. which comprises covering a mass of solid aluminum chloride in a melting vessel with a mass of a solid alkali metal chloride of the group consisting of sodium, potassium and lithium chlorides, the molar proportion of aluminum chloride in the aluminum chloride-alkali metal chloride mixture ranging between about 52% and about 82%, heating the resulting salt mass to a temperature of at least about 300° C. to form a clear homogeneous melt, then stirring the melt, cooling the stirred melt until it solidifies, and then comminuting the resulting solid product into a form suitable for use as a soldering flux.

6. A solder-flux composite for aluminum which comprises a physical association of a metallic solder and a flux composed essentially of the product of fusing to homogeneity a mixture of aluminum chloride and an alkali metal chloride of the group consisting of sodium, potassium and lithium chlorides in which the molar proportion of aluminum chloride in the aluminum chloride-alkali metal chloride mixture ranges between about 52% and about 82%.

7. A solder flux composite for aluminum which comprises a physical association of a metallic solder and a flux composed essentially of the product of fusing to homogeneity a mixture of aluminum chloride, an alkali metal chloride of the group consisting of sodium, potassium and lithium chlorides and a chloride of a heavy metal, the molar proportion of aluminum chloride in the aluminum chloride-alkali metal chloride component of the mixture ranging between about 52% and 82% and the amount of heavy metal chloride not exceeding about 50% by weight of the mixture, said product being in finely divided condition in intimate admixture with a metallic solder.

8. A solder flux composite for aluminum which comprises a physical association of a metallic solder and a flux composed essentially of the product of fusing to homogeneity a mixture of aluminum chloride, an alkali metal chloride of the group consisting of sodium, potassium and lithium chlorides and a chloride of a heavy metal, the molar proportion of aluminum chloride in the aluminum chloride-alkali metal chloride component of the mixture ranging between about 52% and 82% and the amount of heavy metal chloride between about 1% and 25% by weight of the mixture, said product being in finely divided condition in intimate admixture with a metallic solder.

9. A solder flux composite for aluminum which comprises a physical association of a metallic solder and a flux composed essentially of the product of fusing to homogeneity a mixture of aluminum chloride, an alkali metal chloride of the group consisting of sodium, potassium and lithium chlorides and stannous chloride, the molar proportion of aluminum chloride in the aluminum chloride-alkali metal chloride component of the mixture ranging between about 52% and 82% and the amount of stannous chloride between about 1% and 25% by weight of the mixture, said product being in finely divided condition in intimate admixture with a metallic solder.

References Cited in the file of this patent

UNITED STATES PATENTS

| | | |
|---|---|---|
| 1,312,154 | Bonsteel | Aug. 5, 1919 |
| 2,507,346 | Miller | May 9, 1950 |